(12) United States Patent
Gupta et al.

(10) Patent No.: US 6,763,384 B1
(45) Date of Patent: Jul. 13, 2004

(54) EVENT-TRIGGERED NOTIFICATION OVER A NETWORK

(75) Inventors: Manish Gupta, New Delhi (IN);
Natwar Modani, New Delhi (IN);
Parul A Mittal, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 750 days.

(21) Appl. No.: 09/613,524

(22) Filed: Jul. 10, 2000

(51) Int. Cl.[7] ............................................. G06F 15/173
(52) U.S. Cl. ...................................... 709/224; 709/226
(58) Field of Search ............................... 709/224, 205, 709/223, 203, 235, 226, 318; 705/14, 1

(56) References Cited

U.S. PATENT DOCUMENTS

| | | | | |
|---|---|---|---|---|
| 5,050,104 A | * | 9/1991 | Heyen et al. | 345/556 |
| 6,185,613 B1 | * | 2/2001 | Lawson et al. | 709/224 |
| 6,480,883 B1 | * | 11/2002 | Tsutsumitake | 709/203 |
| 6,591,279 B1 | * | 7/2003 | Emens et al. | 707/201 |

* cited by examiner

*Primary Examiner*—Ario Etienne
*Assistant Examiner*—Sahera Halim
(74) *Attorney, Agent, or Firm*—McGinn & Gibb, PLLC; T. Rao Coca, Esq.

(57) ABSTRACT

Internet services that rely on the transfer of real-time information have proliferated in recent years. Given the amount of information generated on the Internet, a user may request to be notified whenever particular information becomes available, such as the current highest bid in an on-line auction. The user enrols to receive one or more messages and sends a list of desired messages through a client process running on the user's computer system. When the user is ready to receive messages, the client process connects to a notification server and provides its receiving address identifier. It then disconnects from the notification server and waits for messages. A message monitor detects the occurrence of events that trigger notifications, and informs the notification server of the event. The notification server determines the appropriate recipient for the notification, and sends it using a server-initiated end-to-end message transfer mechanism to the clients' receiving address identifiers. The notification can also be used as a control signal to control one or more applications, or to control an appliance remotely over a network. The notification server may make use of load-sharing devices or proxy servers to distribute the notification to the client processes.

29 Claims, 6 Drawing Sheets

EVENT-TRIGGERED NOTIFICATION OVER A NETWORK

FIELD OF THE INVENTION

This invention relates to computing systems that are used for the provision of goods, services or information services. It relates in particular to a method and system for notifying end users over a network of the occurrence of an event.

BACKGROUND OF THE INVENTION

The influence of the Internet is becoming all-pervasive in the modern economy. The ability to convey information around the world almost instantaneously is transforming the way many existing businesses operate. In addition, many new services are appearing which exploit the possibilities of the global communication network.

Internet services that rely on the transfer of real-time information have proliferated in recent years. Examples are many and varied, and include websites that provide up to the minute information regarding bathing conditions at beaches, and websites that display sports scores in real time. Weather conditions and the road traffic situation can also be updated on-line on a regular basis, as can Stock Market prices.

One area which has seen rapid growth is that of on-line auctions. Goods are offered for auction at many sites on the World Wide Web. If an Internet user desires an article currently being auctioned, he or she may place a bid on-line. As the auction of the article in question may extend for several days, there is a need to track the current highest bid over an extended period. The bidder may wish to be notified whenever the highest bid changes.

Given the vast amount of information generated on the Internet, a user may request to be notified whenever particular information becomes available. There are several notification mechanisms currently in use for informing users of particular events.

The most elementary notification mechanism is based on the "pull" technology where a client explicitly pulls new information from a server. Examples of websites using this technology for on-line auctions are known. Such systems tell the user to click on a reload button to see the latest information, for example the current highest bid in open-outcry auctions. This method has several disadvantages. It requires explicit user intervention to obtain the latest information, and this can be quite time consuming for the user. Also, since the user cannot correctly guess when the information content will change, this method leads to a waste of bandwidth resources when the user sends a request but the information has not changed. On the other hand, if the user waits too long before requesting the information it might be received too late; for example, after an auction has ended.

Another notification mechanism is "client polling" wherein the client periodically polls a server for new information. Again, the information is being pulled by the client, but this may be done by an application running automatically on the user's system, without any intervention by the user. An example of this mechanism can be found in a website which uses an HTTP refresh mechanism to automatically refresh a web page displaying the latest scores for cricket matches every ninety seconds. Such polling schemes overcome the problem of user intervention by pulling information automatically on a periodic basis. However, these schemes have several disadvantages. The most important is bandwidth wastage. If the polling interval is kept small, the information content of the page is unlikely to change within one polling interval, and hence bandwidth resources are wasted in sending the fruitless client polling request. On the other hand, if the polling interval is long, the information may not get delivered to the user in time. If too many clients are polling a server frequently, there can be an enormous load on that server. In consequence, these polling schemes may not be highly scalable.

A third method for notification is based on a "push" by the server, on a persistent connection initiated by the client. Once the client application has connected to the server, it remains connected. When the server has some information to send, it pushes that information on this open connection. Examples of such systems are most "chat" applications and the Yahoo™ Messenger service. Although this mechanism supports the event-triggered delivery of a message, thereby guaranteeing timely notification, the method wastes server resources. The server needs to have open connections with a large number of clients that wish to receive real-time notification. This puts a restriction on the number of clients that can be on-line simultaneously and makes the system less scalable. To maintain an open connection, some form of "I am alive" message has to be periodically exchanged between the server and the client, and this too leads to bandwidth wastage.

Other system use email as a notification mechanism. There are several well-known examples of websites which allow users to receive email alerts for various predefined events. These email notifications do not have bandwidth wastage problems, but they cannot be regarded as real-time in nature, as there is no guaranteed upper limit to the delay between transmission and reception. The final portion of the path from the destination mail server to the client application uses either a polling scheme, or maintains an open connection. Furthermore, the highest bid update in an open-outcry auction should not be sent by email, as this would lead to a very large number of emails being sent to the user, wasting time and causing much frustration. This kind of frequently changing data is not suited to the email world.

There is consequently a need for a notification mechanism which allows real-time message notification without blocking server resources or requiring excessive bandwidth usage. The present invention seeks to at least partially meet this need.

By way of further background, the communication systems as described above are typically implemented on large computing systems which commonly employ a three-tier topology: 1) a presentation tier characterised by multiple workstations focussing on user interactions, 2) a business tier characterised by multiple servers executing application/business logic, and 3) a data tier characterised by multiple databases working on data storage and organization. The three tier elements may be interconnected by means of a Local or Wide Area Network (LAN/WAN) or the Internet.

SUMMARY OF THE INVENTION

The broad gist of the invention is for clients to register a set of events of interest and their identity with a server, such that when one such event occurs, the server causes a real-time connection over the network to transmit the event only to those interested clients.

According to a first aspect of the invention there is provided a method for notifying the occurrence of an event to one or more client processes over a communication network, the method comprising the steps of:

said one or more client processes registering a set of said events of interest and, when said client processes are currently active, registering their respective address identifiers with a server;

said server detecting the occurrence of an event;

said server identifying which of said client processes are interested in notification of said event and are currently active; and said server causing a real-time connection over said network to transmit said notification to each identified client process.

According to a second aspect of the invention there is provided a method for notifying the occurrence of an event by one or more servers to one or more client processes over a communication network, the method comprising the steps of:

said one or more client processes registering a set of said events of interest and, when said clients are currently active, registering their respective address identifiers;

forming a first record of said client processes and their respective events of interest;

forming a second record containing current active ones of all said client processes and their respective address identifiers, said first and second records being available to said servers;

detecting the occurrence of an event;

identifying from said first record which of said client processes are interested in notification of said event; and causing a real-time connection over said network to transmit said notification to each interested client process using the address identifiers stored in said second record.

According to a third aspect of the invention there is provided a communications system providing notification of the occurrence of an event, comprising:

a communication network;

one or more client processes coupled to said network; and one or more server processes coupled to said network;

and wherein said one or more client processes register a set of said events of interest and, when currently active, their respective address identifiers with one or more of said server processes, and one or more of said server processes detect the occurrence of an event, identify which of said client processes are interested in notification of said event and are currently active, and cause a real-time connection over said network to transmit said notification to each identified client process.

According to a further aspect of the invention there is provided a communications system providing notification of the occurrence of an event, comprising:

a communication network;

one or more client processes coupled to said network; and one or more server processes coupled to said network;

and wherein said one or more client processes register a set of said events of interest and, when currently active, register their respective address identifiers with one or more of said server processes, and said server processes form a first record of said client processes and their respective events of interest, form a second record containing current active ones of all said client processes and their respective address identifiers, said first and second records being available to a plurality of said server processes, detect the occurrence of an event, identify, from said first record, which of said client processes are interested in notification of said event and are currently active, and cause a real-time connection over said network to transmit said notification to each identified client using the address identifiers stored in said second record.

According to a further aspect of the invention there is provided a notification server for notifying the occurrence of an event to one or more client processes over a communications network, the notification server comprising:

a data store storing registration data from said client processes regarding events of interest to said client processes and, when said clients are currently active, their respective address identifiers;

a processor linked to said data store, receiving notification of an event having occurred, and searching said data store for those of the currently active client processes interested in said event; and network connection means, linked to said processor, whereby a notification of said event is output to be sent to said interested client processes.

According to a further aspect of the invention there is provided a computer program product having a computer usable medium having a computer program embodied therein, for providing notification of the occurrence of an event over a network, said computer program product including:

computer program code means for registering a set of events of interest to one or more clients and, when said one or more clients are ready to receive notification, registering their respective address identifiers with a server;

computer program code means for detecting the occurrence of an event;

computer program code means for identifying which of said clients are interested in notification of said event and are currently active; and computer program code means for causing a real-time connection over said network to transmit said notification to each identified client.

BRIEF DESCRIPTION OF THE DRAWINGS

Embodiments of the invention will now be described with reference to the accompanying drawings, in which.

DETAILED DESCRIPTION OF EMBODIMENTS AND BEST MODE

Network Arrangement

Figure 1:
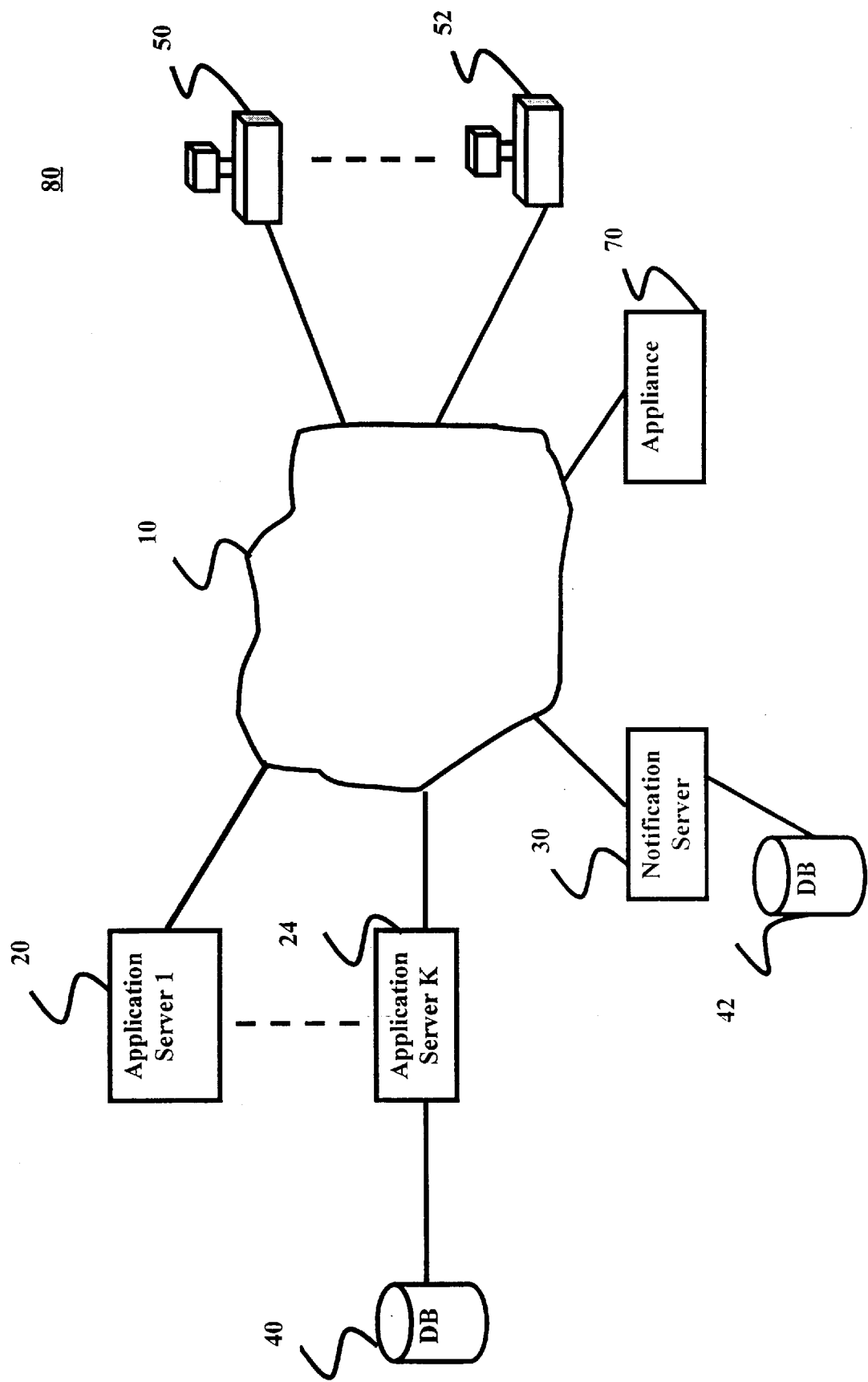
FIG. 1 is a representative topology of a networked computer system.

FIG. 1 is a representative topology of a networked computer system 80 embodying the invention. A plurality of devices 20–70 are connected by means of a communications network 10. The network 10 can be an Intranet, the Internet or an Extranet. The networked computer system 80 comprises three tiers. The presentation (or client/user) tier is represented by a number (1. . . n) of workstations 50–52 that can be appropriate computing terminals, for example personal computers. This tier may also comprise an appliance 70 capable of connecting to the network 10. The business tier is represented by a number (1. . . k) of servers 20, 24, 30 that can be dedicated mini or mainframe computers. The data tier is represented by a number (1. . . m) of databases 40, 42, which can include dynamically managed magnetic or optical storage media. Within the specification, the term "databank" refers both to data-structures in secondary storage devices such as databases 40, 42 or to data-structures in the main memory of servers such as the application server 20 or the notification server 30.

The application servers 20–24 each run a plurality of processes with at least one process on each application server 20–24 generating messages that need to be transmitted in real-time to a plurality of end-users. Each application server 20–24 also maintains and updates a databank of the messages and a list of clients interested in these messages. In the case of application server 20 the databank is stored in main memory, while in the case of application server 24 the databank is stored in the database 40.

Among the plurality of processes running on each application server 20–24 there is a message monitor that detects the occurrence of messages (i.e. "events"), captures these messages and sends them to the notification server 30.

Client Processes

Figure 2A:
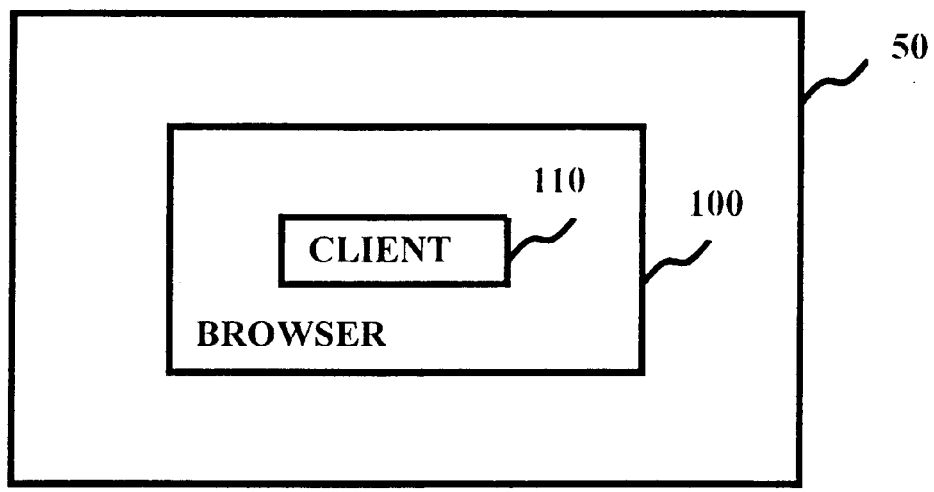
FIG. 2a illustrates the use of client software within a web browser.

FIG. 2a illustrates schematically some of the software applications present within an end user's computer system 50. The software includes a web browser 100 which enables the end user to view web pages available on the Internet. The most commonly used browsers 100 are Microsoft Internet Explorer™ and Netscape Navigator™. The end user's computer system 50 also includes a client process 110 which runs on behalf of the end user. The client process 110 notifies one or more of the application servers 20–24 of what messages the end user wishes to receive. The client process 110 can dynamically update this list of desired messages according to the end user's preferences. The client process 110 may disconnect from the network 10 after sending this list of desired messages. When the client process 110 is ready to receive messages, it registers itself with the notification server 30. The registration information required by the notification server 30 will comprise the identity of the client process 110 together with a receiving address identifier. The receiving address identifier could, for example, include an IP (Internet Protocol) address and port number, together with the protocol to be used. The client process 110 needs to keep only its receiving address alive and may otherwise disconnect from the notification server 30. The client process 110 can be a mobile agent that is sent over the network 10 to the user's computer system 50. It can be automatically executed at the user's end within a web browser 100 whenever the user visits a page that refers to the mobile client. An example of such a client is an applet displayed within an HTML page. When the client is an applet, support for opening a socket is required. This is currently possible with a Java™ plug-in or by using Java version 1.2.

Alternatively, the client process 110 is downloaded over the network 10 to the user's computer system 50 the first time the user enrols for message notification. The downloaded client software is in the form of an application. Subsequently, this application can get invoked from the user's computer system 50 either automatically at machine start-up or manually by the user. The application can also be configured as a plug-in to the web browser 100. In this case the plug-in is invoked when the user opens an appropriate web-page.

Notification of Events The notification server 30 maintains and updates a databank of clients 110–118 that are on-line. On receiving a message from the message monitor, the notification server 30 determines the intended recipients of the message using the databank of messages that the clients 110–118 wish to receive. The notification server 30 may refer directly to the databank maintained by an application server 20–24, or it may maintain a local copy of the databanks maintained by the application servers 20–24. These copied databases may be maintained either within the main memory of the notification server 30, or in a separate database 42. Once the notification server 30 has received messages and identified the intended recipients, it will generate notifications that are sent to the intended recipients that are currently on-line.

There are two types of databank maintained by the notification server 30. The first databank comprises a list of clients together with the messages of interest to those clients. Table 1 shows a hypothetical example of this type of databank.

TABLE 1

Message Databank

| Client ID | Message of Interest |
| --- | --- |
| Bill | Start of an Auction on an "IBM Thinkpad" |
| Bill | Close of the Auction on a "PowerPC" |
| Fred | IBM Stock Price change of more than 5% |
| Joe | Change in the highest bid in the "IBM Thinkpad" auction |

The second data-bank is a list of clients that are currently active. In this context "active" refers to the readiness of the client to receive notification messages. Table 2 shows a hypothetical example of this type of databank.

TABLE 2

Client Databank

| Client ID | Receiving Address Identifier (IP Address:Port Number) |
| --- | --- |
| Bill | 9.184.208.12:6758 |
| Fred | 123.100.208.82:8080 |

Upon detection, by one of the application servers 20–24, of one of the messages/events of interest to the various clients (i.e. Table 1), the notification process is performed. The relevant application server passes the message, which is married to the relevant client(s)' receiving address, to the notification server. The on-line clients 110–118 receive the messages sent by the notification server 30, interpret these messages and display them to the end user.

The notifications can be received by any form of device which can connect to the network 10 and which is capable of running client software. This can include mobile phones having Wireless Application Protocol (WAP) capability.

The notification server 30 uses a server-initiated end-to-end message transfer mechanism (SI-MTM) to send notifications to the on-line clients 110–118. In SI-MTM, the client is disconnected from the notification server 30 and only has an alive receiving address. The SI-MTM can be either connection-orientated or a connectionless mechanism in which the delivery of the message may not be guaranteed. The SI-MTM can be a point-to-point communication or a multicast communication. The notification server 30 initiates the transfer of the message and sends the message to the receiving address of the client process 110–118.

The notification server 30 opens a connection with the client process 110–118 at the client's receiving address. It then sends the notification and immediately closes the connection. An example of this type of SI-MTM is an end-to-end TCP (Transmission Control Protocol) connection that is initiated by the notification server 30. TCP specifies the structure of the messages, what acknowledgments are required between the source and the destination to obtain reliable data transfer, and how errors are detected and corrected. Alternatively, the notification server 30 may not close the connection immediately after sending the notification, but may wait for a period of inactivity before breaking the is connection with the client process 110–118. This approach optimizes the use of the connection, while still reducing the load by closing connections that have become inactive.

An alternative to using TCP is to make use of a datagram service with no intermediate storage. An example of this type of SI-MTM is the User Datagram Protocol (UDP) where the datagram's origin is a notification server 30 and the destination is the receiving address of the client process 110–118. UDP can also be a multi-cast message transfer. UDP makes use of the underlying Internet protocol to transport a message from one node to another. It provides the facility of distinguishing among multiple destinations on a given host computer.

In general if a message in which an end user is interested is generated by an application server 20–24 while the client process 110 acting on behalf of the end user is off-line, no notification will be sent. It is, however, possible for the notification server 30 to store notifications intended for clients that are not currently on-line. The notification server 30 may send some or all of these messages to the end user through other means such as email, postal mail or facsimile. Alternatively, it may deliver some or all of these messages to the clients 110–118 when they next register.

The message generated by the application servers 20–24 will often comprise information to be conveyed to the end user. However, the client software 110–118 may alternatively use the notification as a control signal to control one or more applications running on the client's system 50–52. The notification can also be used to control an appliance 70 remotely over a network 10.

Figure 2B:
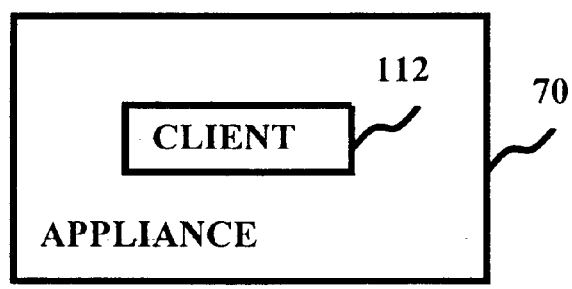
FIG. 2b illustrates the use of client software within an appliance.

As shown in FIG. 2b, the appliance 70 has a built-in client 112 that can receive and send messages over the network 10. In this case an application server 20–24 and notification server 30 will constitute an appliance management service, which may be owned or operated by a third party. The messages which are sent to the appliance 70 can be generated by the owner of the appliance 70 or by other appliances (not shown) which are connected to the network 10. The appliance 70 can register with the appliance management service in order to receive message notification. It can also generate messages to be sent to other appliances, sending them via the appliance management service. For example, the appliance 70 can have an embedded Java client 112. The appliance owner starts the appliance 70, and before leaving home informs the appliance 70 to go on-line. When the owner wishes to switch off the appliance 70 he or she does so through the appliance management service website. The appliance management service will send a message notification to the appliance 70 in real time, causing the appliance 70 to switch off.

EXAMPLE 1

Notification Server and Multiple Servers/Multiple Clients

An end user is browsing a website that publishes a list of messages or events that the user can choose to be notified of in real-time. This could be, for example, an on-line open-outcry auction site that can notify users whenever there is a change in the current highest bid. The user decides to enrol to receive one or more messages and sends a list of desired messages to the website through a client process 110 running on the user's computer system 50. The client process 110 may disconnect after sending the list of messages if the user does not want to start receiving messages immediately. Once the user wants to start receiving messages, the client process 110 connects to the notification server 30 and sends a message which comprises the identity of the client process 110 together with its receiving address identifier. The notification server 30 updates the databank of clients 110–118 that are currently on-line. The client process 110 then disconnects from the notification server 30 and waits for messages on the receiving address identifier.

Figure 3:
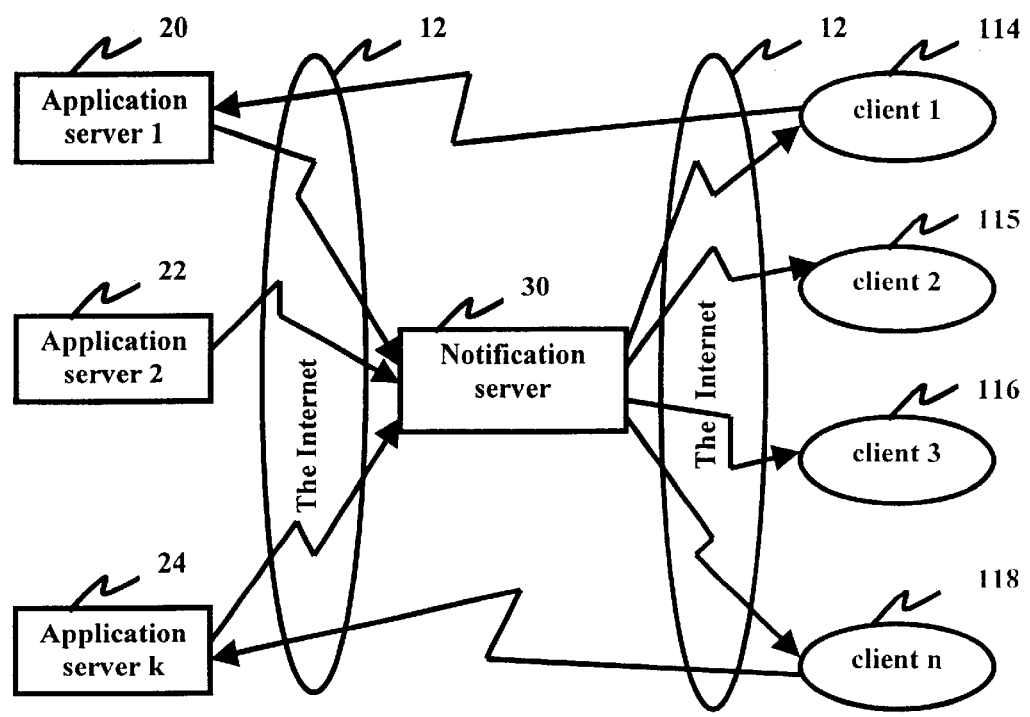
FIG. 3 illustrates dataflow in an embodiment where a notification server serves multiple application servers and multiple clients.

FIG. 3 illustrates the flow of information that occurs when a message is generated. Whenever one of the application servers 20–24 generates an event for which notifications need to be sent to a client 114–118, a message monitor will inform the notification server 30. The notification server 30 determines the recipients for this notification, using the list of desired messages that the users have provided, together with the list of on-line clients 114–118. It then sends this notification using the server-initiated end-to-end message transfer mechanism to the receiving address identifier of the clients 114–118. When one of the clients 114–118 wishes to go off-line, it sends a message to inform the notification server 30. The notification server 30 then flags the client as not being on-line.

In many cases, the plurality of application servers 20–24 will be individually owned and operated as different websites. The notification server 30 may be owned or operated by a third-party service provider. The owners of the application servers 20–24 may choose to use the services of the notification server 30. In this case when the notification server 30 is started, it requests the application servers 20–24 to supply their databanks of messages desired by users together with details of the appropriate clients 114–118. The notification server 30 will maintain a local copy of these databanks and will keep it synchronized with the databanks of the respective application servers 20–24. Client registration at the time of going on-line will still occur with the notification server 30.

In order to reduce the amount of data that needs to be sent with each notification, the transmitted message need contain only the changed data, for example, the amount of the winning bid for an auction site. The client then dynamically generates a display incorporating the changed data for the user to view. An example of this is when data is sent in XML (eXtensible Markup Language). XML data contains only information regarding the content and structure of a message. It contains no information relating to the visual presentation of the message. In order to display the information to the user in a web browser 100, the XML data needs to be transformed into HTML (HyperText Markup Language) using technology such as CSS (Cascading Style Sheets) or XSL (eXtensible Stylesheet Language). The conversion from XML to HTML can be performed by the client 114–118, thus shifting some processing load from the application servers 20–24 to the clients 114–118. Since this reduces the amount of data that needs to be sent in every notification, the overall scalability of the system is enhanced.

EXAMPLE 2

Load-sharing Devices

Figure 4:
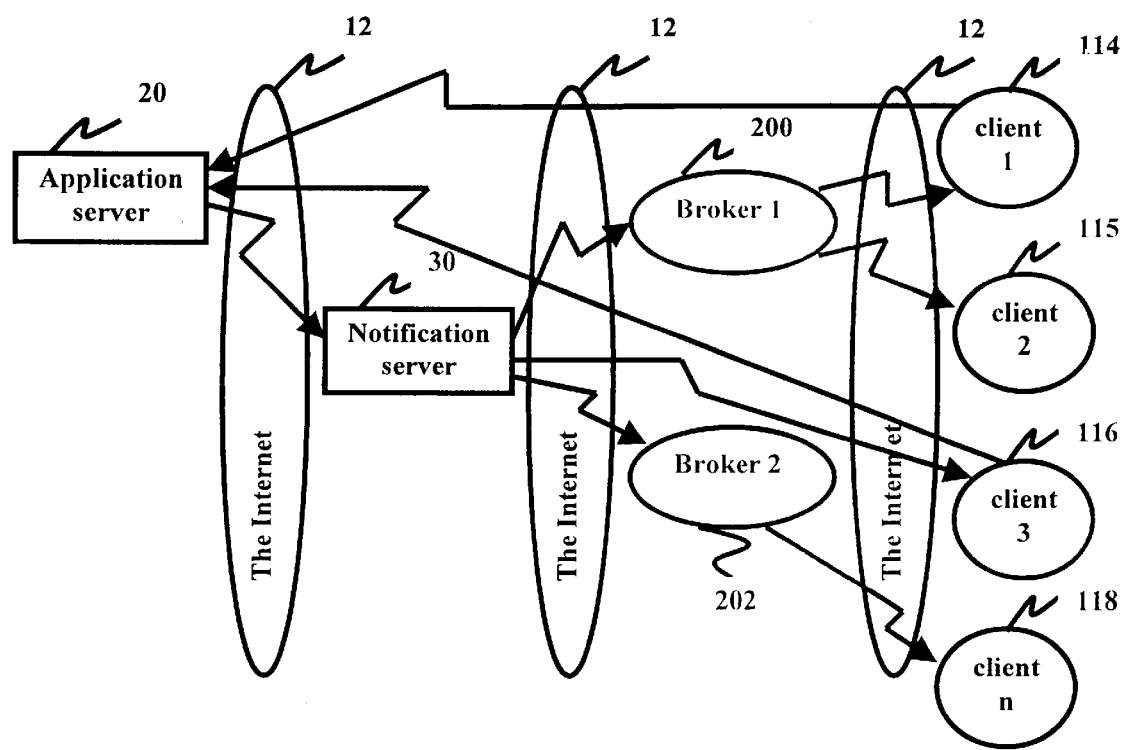
FIG. 4 illustrates the flow of data in an embodiment in which the notification server utilizes brokers for load distribution.

In another embodiment, event-triggered notification uses a plurality of load-sharing devices referred to as "brokers". As illustrated in FIG. 4, the notification server 30 can distribute notifications to clients 114–118 via brokers 200, 202.

When a client 114–118 registers with the notification server 30, the notification server 30 assigns the client 114–118 to one of the brokers 200, 202. This assignment can be done on the basis of factors such as the client's interest list, geographical location or the SOCKS/proxy settings described below. Any notification for the clients 114–118 is sent to the corresponding broker 200, 202. In FIG. 4 broker 200 forwards messages to clients 114 and 115, while broker 202 forwards messages to client 118. In addition to messages sent via the brokers 200, 202, notification may still be sent directly from the notification server 30. The broker 200, 202 determines the intended recipients for the message using the databank of messages of interest to the clients 114–118 and forwards the message in real-time to the intended clients 114–118. Each broker 200, 202 maintains a local copy of the databanks maintained by the application server 20.

Instead of assigning a client to a broker at the time that client registers with the notification server 30, the assignment of clients to brokers may be done dynamically for each notification message. Once again the assignment will be based on factors like the client's interest list, geographical location, or SOCKS/proxy settings. When the assignment of clients to brokers is done on a per-message basis, the broker 200, 202 does not maintain a databank of intended clients, but receives the list of intended clients from the notification server 30 along with the notification message.

Instead of using brokers, load sharing can also be achieved by using mirror sites or else by using multiple servers on the same site. The purpose of these load sharing devices is to reduce the number of messages that the notification server 30 is required to send out. This in turn improves the scalability of the notification system.

EXAMPLE 3

Sending Notification Through Firewalls

Figure 5:
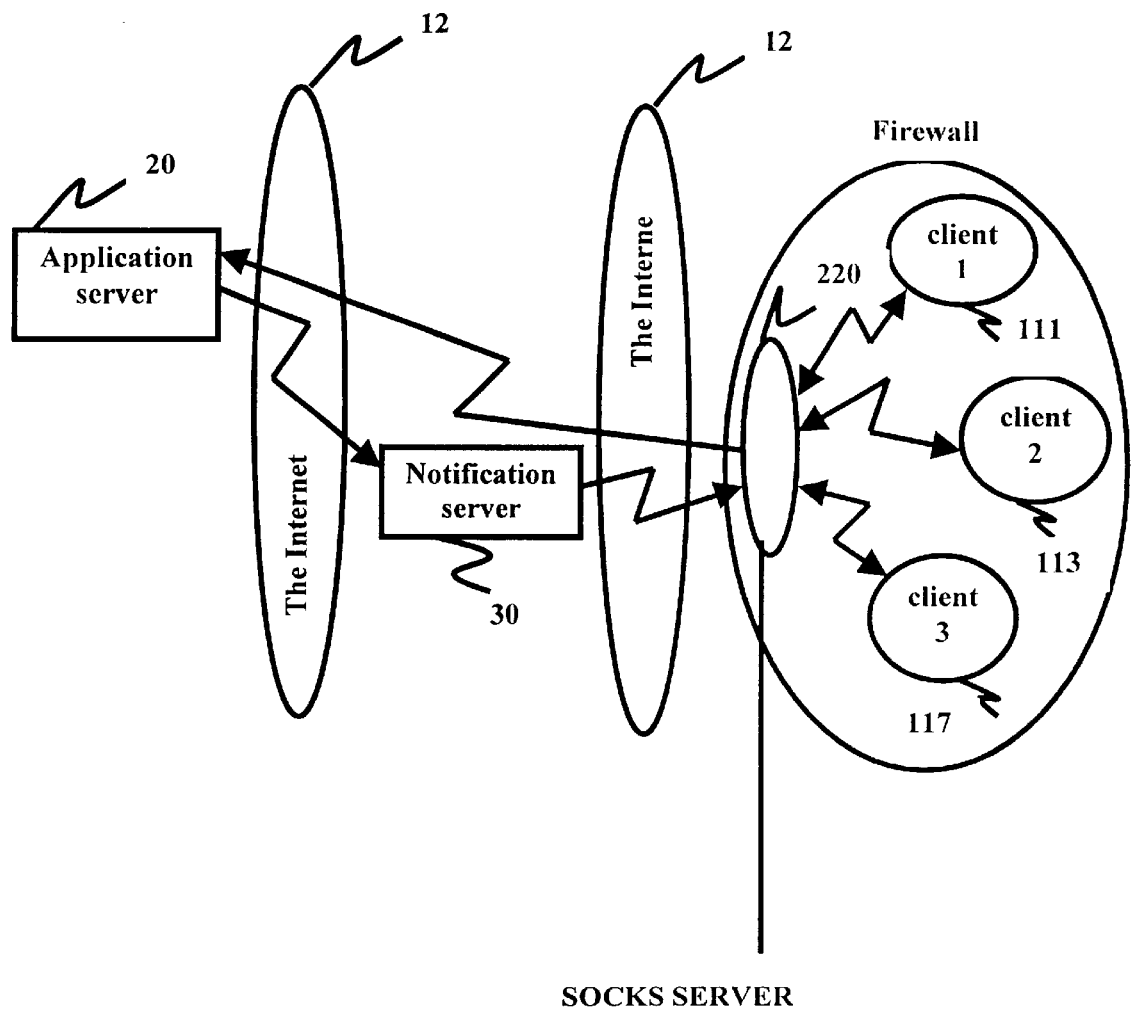
FIG. 5 illustrates the flow of data in an embodiment in which the clients are protected by a firewall.

In general, organizations which own computer networks wish to prevent unauthorized access to the information contained on those networks. A common means of protecting this information is the use of a firewall, which hides the IP (Internet Protocol) addresses inside it from the rest of the Internet. As shown in FIG. 5, when clients 111, 113, 117 are hidden behind a firewall 210, the notification server 30 is unable to contact the clients 111, 113, 117 directly. There are two approaches to overcoming this problem, firstly by using a SOCKS server and secondly by using a "Reverse proxy".

SOCKS is a networking proxy protocol for TCP/IP-based networking applications, that enables hosts one side of the SOCKS server 220 to gain full access to hosts on the other side of the SOCKS server 220 without requiring direct IP reachability. SOCKS redirects connection requests from hosts on opposite sides of the SOCKS server 220. The SOCKS server 220 authenticates and authorizes the requests, establishes a proxy connection, and relays data. SOCKS has the flexibility to protect the network through access control policies based on user, application and time, in addition to the source and destination addresses.

The SOCKS server 220 is configured such that the notification server 30 (or a broker) that wishes to send a notification to a client 111, 113, 117 located behind the firewall 210 talks first to the SOCKS server 220. The SOCKS server 220 authenticates the connection opened by the notification server 30 and relays data to the clients 111, 113, 117 residing inside the firewall 210.

The second way in which a notification server 30 may send a notification to the client 111, 113, 117 inside a private network hidden behind a firewall 210, is by talking to a reverse proxy. The term "reverse proxy" is used because the clients of the proxy lie outside the firewall 210. Whereas SOCKS functions at the TCP/UDP layer, the reverse proxy is IP-layer based and uses network address translations. The proxy can talk to any server inside the firewall 210.

Whether SOCKS or a reverse proxy is used, the client 11, 113, 117 within the firewall 210 is required to download a signed applet from the application server 20 that is generating notifications. The signed applet runs a server socket on a port. This server socket listens on the port and expects communication from the notification server 30.

The applet provides the notification server 30 with the IP address and the port number on which the server socket is running. This information is provided at the time client 111, 113, 117 comes on-line. In addition the client must give network access to the applet to receive connections from hosts other than the application server 20 from which the applet was downloaded. In addition, the notification server 30 must be provided with the IP address of the reverse proxy or the SOCKS server 220, as the case may be.

If the notification server 30 has to talk to a reverse proxy, then the notification server 30 would use HTTP tunnelling to send notification. On the other hand if a SOCKS server 220 is used, the notification may be sent using either HTTP tunnelling or by opening a TCP connection, depending on how the SOCKS server 220 is configured.

Computer Implementation

Figure 6:
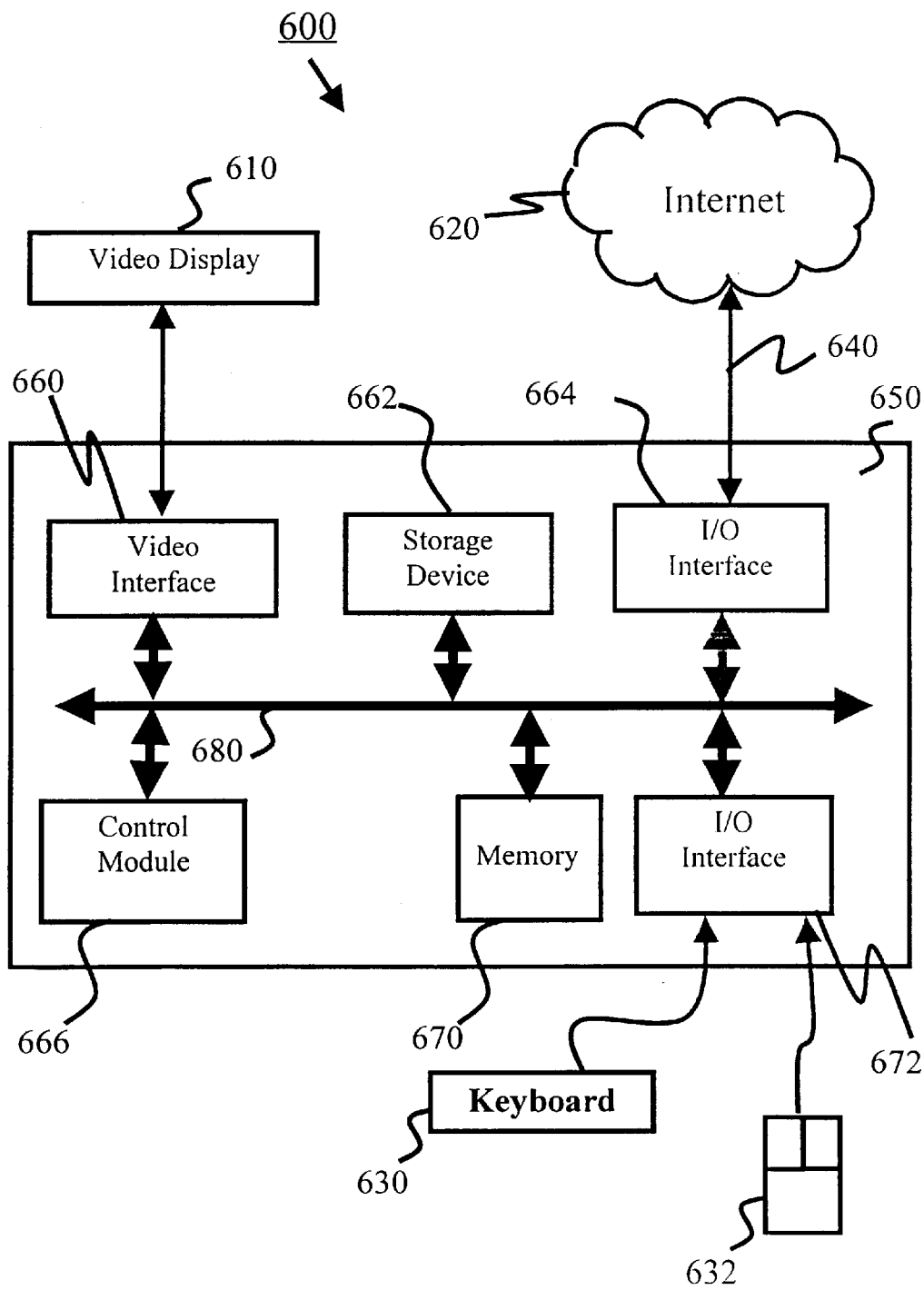
FIG. 6 illustrates a computer system on which an embodiment may be implemented.

The process for event-triggered notification over a network can be implemented using a computer program product in conjunction with a computer system 600 as shown in FIG. 6. In particular, the process for event-triggered notification over a network can be implemented as software, or computer readable program code, executing on the computer system 600.

The computer system 600 includes a computer 650, a video display 610, and input devices 630, 632. In addition, the computer system 600 can have any of a number of other output devices including line printers, laser printers, plotters, and other reproduction devices connected to the computer 650. The computer system 600 can be connected to one or more other computers via a communication input/output (I/O) interface 664 using an appropriate communication channel 640 such as a modem communications path, an electronic network, or the like. The network may include a local area network (LAN), a wide area network (WAN), an Intranet, and/or the Internet 620.

The computer 650 includes the control module 666, a memory 670 that may include random access memory (RAM) and read-only memory (ROM), input/output (I/O) interfaces 664, 672, a video interface 660, and one or more storage devices generally represented by the storage device 662. The control module 666 is implemented using a central processing unit (CPU) that executes or runs a computer readable program code that performs a particular function or related set of functions.

The video interface 660 is connected to the video display 610 and provides video signals from the computer 650 for display on the video display 610. User input to operate the computer 650 can be provided by one or more of the input devices 630, 632 via the I/O interface 672. For example, a user of the computer 650 can use a keyboard as I/O interface 630 and/or a pointing device such as a mouse as I/O interface 632. The keyboard and the mouse provide input to the computer 650. The storage device 662 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 650 is typically connected to other devices via a bus 680 that in turn can is consist of data, address, and control buses.

The method steps for event-triggered notification over a network are effected by instructions in the software that are carried out by the computer system 600. Again, the software may be implemented as one or more modules for implementing the method steps.

In particular, the software may be stored in a computer readable medium, including the storage device 662 or that is downloaded from a remote location via the interface 664 and communications channel 640 from the Internet 620 or another network location or site. The computer system 600 includes the computer readable medium having such software or program code recorded such that instructions of the software or the program code can be carried out. The use of the computer system 600 preferably effects advantageous apparatuses for constructing a runtime symbol table for a computer program in accordance with the embodiments of the invention.

The computer system 600 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 666. Intermediate storage of the program code and any data including entities, tickets, and the like may be accomplished using the memory 670, possibly in concert with the storage device 662.

In some instances, the program may be supplied to the user encoded on a CD-ROM or a floppy disk (both generally depicted by the storage device 662), or alternatively could be read by the user from the network via a modem device connected to the computer 650. Still further, the computer system 600 can load the software from other computer readable media. This may include magnetic tape, a ROM or integrated circuit, a magneto-optical disk, a radio or infrared transmission channel between the computer and another device, a computer readable card such as a PCMCIA card, and the Internet 620 and Intranets including email transmissions and information recorded on Internet sites and the like. The foregoing are merely examples of relevant computer readable media. Other computer readable media may be practised without departing from the scope and spirit of the invention.

The event-triggered notification over a network can be realised in a centralised fashion in one computer system 600, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, an apparatus, and a computer program product for event-triggered notification over a network are disclosed. While only a small number of embodiments are described, it will be apparent to those skilled in the art in view of this disclosure that numerous changes and/or modifications can be made without departing from the scope and spirit of the invention.

Advantages of the Invention

An advantage of the event-triggered notification described herein is that timely delivery of messages is ensured, while limiting inefficient usage of the bandwidth resources of the communications network.

It is be understood that the invention is not limited to the embodiments described, but that numerous alterations and modifications, as would be apparent to one skilled in the art, are included within its scope.

We claim:

1. A method for notifying the occurrence of an event to one or more client processes over a communication network, the method comprising the steps of:

said one or more client processes registering a set of said events of interest and, when said client processes are curtly active, registering their respective address identifiers with a server;

said server detecting the occurrence of an event;

said server identifying which of said client processes are interested in notification of said event and are currently active;

said server causing a real-time connection over said network to transmit said notification to each identified client process;

said server transmitting updated data to said identified client process relating to said occurrence of an event, wherein said updated data comprises changed data of said occurrence of an event; and terminating a connection between said server and said identified client process when a period of inactivity of detecting said occurrence of an event exist.

2. The method of claim 1, wherein said the event of interest registration exists as a record that is available to a plurality of servers and wherein said event can be detected by any one of said plurality of servers.

3. The method of claim 1, wherein said transmission step includes the further step of passing said notification via a notification server.

4. The method of claim 3, wherein said transmission step further includes said notification server passing said notification to said identified client processes via one or more load-sharing devices or proxy servers.

5. The method of claim 1, wherein said registering step includes the steps of:

forming a first record of all client processes and their respective events of interest; and forming a second record containing current active ones of all said client processes and their active address identifiers.

6. The method of claim 5, comprising the further step of client processes rescinding active status, and their respective address identifiers being removed from said second record.

7. A method for notifying the occurrence of an event by one or more servers to one or more client processes over a communication network, the method comprising the steps of:
   said one or more client processes registering a set of said events of interest and, when said clients are currently active, registering their respective address identifiers;
   forming a first record of said client processes and their respective events of interest;
   forming a second record containing current active ones of all said client processes and their respective address identifiers, said first and second records being available to said servers;
   detecting the occurrence of an event;
   identifying from said first record which of said client processes are interested in notification of said event;
   causing a real-time connection over said network to transmit said notification to each interested client process using the address identifiers stored in said second record;
   said servers transmitting updated data to said identified client process relating to said occurrence of an event, wherein said updated data comprises changed data of said occurrence of an event; and
   terminating a connection between said servers and said identified client process when a period of inactivity of detecting said occurrence of an event exists.

8. The method of claim 7, wherein said transmission step includes the further step of passing said notification via a notification server.

9. The method of claim 7, comprising the further step of client processes rescinding active status, and their respective address identifiers being removed from said second record.

10. The method of claim 7, wherein said transmission step further includes said notification server passing said notification to said interested client processes via one or more load-sharing devices or proxy servers.

11. A communications system providing notification of the occurrence of an event, comprising:
    a communication network;
    one or more client processes coupled to said network; and
    one or more server processes coupled to said network;
    and wherein said one or more client processes register a set of said events of interest and, when currently active, their respective address identifiers with one or more of said server processes, and one or more of said server processes detect the occurrence of an event, identify which of said client processes are interested in notification of said event and are currently active, cause a real-time connection over said network to transmit said notification to each identified client process, transmit updated data to said identified client process relating to said occurrence of an event, wherein said updated data comprises changed data of said occurrence of an event, and terminate a connection between said server processes and said identified client process when a period of inactivity of detecting said occurrence of an event exists.

12. The communications system of claim 11, wherein the event of interest registration exists as a record that is available to said one or more server processes and wherein said event can be detected by any one of said server processes.

13. The communications system of claim 11, wherein said notification is transmitted via a notification server.

14. The communications system of claim 13, wherein said notification server passes said notification to said identified client processes via one or more load-sharing devices or a proxy server.

15. The communications system of claim 11, wherein one or more of said server processes stores registration information comprising:
    a first record of all client processes and their respective events of interest; and
    a second record containing current active ones of all said client processes and their respective address identifiers.

16. The communications system of claim 15, wherein said client processes rescind their active status, their respective address identifiers then being removed from said second record.

17. A communications system providing notification of the occurrence of an event, comprising:
    a communication network;
    one or more client processes coupled to said network; and
    one or more server processes coupled to said network;
    and wherein said one or more client processes register a set of said events of interest and, when currently active, register their respective address identifiers with one or more of said server processes, and said server processes form a first record of said client processes and their respective events of interest, form a second record containing current active ones of all said client processes and their respective address identifiers, said first and second records being available to a plurality of said server processes, detect the occurrence of an event, identify, from said first record, which of said client processes are interested in notification of said event and are currently active, cause a real-time connection over said network to transmit said notification to each identified client using the address identifiers stored in said second record, transmit updated data to said identified client process relating to said occurrence of an event, wherein said updated data comprises changed data of said occurrence of an event, and terminate a connection between said server processes and said identified client process when a period of inactivity of detecting said occurrence of an event exists.

18. The communications system of claim 17, wherein said notification is transmitted via a notification server.

19. The communications system of claim 17, wherein said client processes rescind their active status, their respective address identifiers then being removed from said second record.

20. The communications system of claim 17, wherein said notification server passes said notification to said interested client processes via one or more load-sharing devices or a proxy server.

21. A notification server for notifying the occurrence of an event to one or more client processes over a communications network, the notification server comprising:
    a data store storing registration data from said client processes regarding events of interest to said client processes and, when said clients are currently active, their respective address identifiers;
    a processor linked to said data store, receiving notification of an event having occurred, and searching said data store for those of the currently active client processes interested in said event; and
    network connection means, linked to said processor, whereby a notification of said event is output to be sent to said interested client processes;

said notification server operable for transmitting undated data to said active client process relating to said event, wherein said updated data comprises changed data of said event; and terminating a connection between said notification server and said active client process when a period of inactivity of detecting said event exists.

22. The notification server of claim 21, wherein said data store includes:

a first record of all said client processes and their respective events of interest; and a second record containing current active ones of all said client processes and their respective address identifiers.

23. The notification server of claim 21, wherein said notification server initiates a message transfer mechanism that is chosen from the set comprising:

an end-to-end TCP connection; and a datagram service with no intermediate storage.

24. A computer program product having a computer usable medium having a computer program embodied therein, for providing notification of the occurrence of an event over a network, said computer program product including:

computer program code means for registering a set of events of interest to one or more clients and, when said one or more clients are ready to receive notification, registering their respective address identifiers with a server;

computer program code means for detecting the occurrence of an event;

computer program code means for identifying which of said clients are interested in notification of said event and are currently active; and computer program code means for causing a real-time connection over said network to transmit said notification to each identified client;

computer program a code means for transmitting updated data to said identified client process relating to said occurrence of an event, wherein said updated data comprises changed data of said occurrence of an event; and computer program code means for terminating a connection between said server and said identified client process when a period of inactivity of detecting said occurrence of an event exist.

25. The computer program product of claim 24, wherein the event of interest registration exists as a record that is available to a plurality of servers and wherein said event can be detected by any one of said plurality of servers.

26. The computer program product of claim 25, further including:

computer program code means for passing said notification via a notification server.

27. The computer program product of claim 26, further including:

computer program code means for passing said notification to said identified clients via one or more load-sharing devices or proxy servers.

28. The computer program product of claim 24, wherein the computer program code means for registration includes computer program code means for:

forming a first record of all clients and their respective events of interest; and forming a second record containing cent active ones of all said clients and their respective address identifiers.

29. The computer program product of claim 28, further including:

computer program code means for rescinding active status of said clients, and removing their respective address identifiers from said second record.

* * * * *